United States Patent
Ciesla

(10) Patent No.: US 9,035,898 B2
(45) Date of Patent: May 19, 2015

(54) SYSTEM AND METHODS FOR RAISED TOUCH SCREENS

(71) Applicant: Tactus Technology, Inc., Fremont, CA (US)

(72) Inventor: Craig M. Ciesla, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 14/242,312

(22) Filed: Apr. 1, 2014

(65) Prior Publication Data

US 2014/0210761 A1     Jul. 31, 2014

Related U.S. Application Data

(63) Continuation of application No. 14/014,014, filed on Aug. 29, 2013, now Pat. No. 8,717,326, which is a continuation of application No. 11/969,848, filed on Jan. 4, 2008, now Pat. No. 8,547,339.

(51) Int. Cl.
    *G06F 3/041*      (2006.01)
    *G09G 5/00*      (2006.01)
    (Continued)

(52) U.S. Cl.
CPC ............ *G06F 3/0414* (2013.01); *G06F 3/0202* (2013.01); *G06F 2203/04809* (2013.01); *G06F 3/016* (2013.01); *G06F 3/0416* (2013.01)

(58) Field of Classification Search
CPC .................. G06F 2203/04809; G06F 3/04895; G06F 3/016; G06F 3/044; G06F 3/04883; G06F 3/04886; G06F 3/0414; H01H 2215/046; G09B 21/003–21/004
USPC .................. 345/156–184; 178/18.01–20.04; 434/112–117
See application file for complete search history.

(56) References Cited

U.S. PATENT DOCUMENTS 3,034,628 A    5/1962   Wadey
3,659,354 A    5/1972   Sutherland
(Continued)

FOREIGN PATENT DOCUMENTS

CN     1260525 A    7/2000
CN     1530818 A    9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Patrick F Marinelli
(74) *Attorney, Agent, or Firm* — Jeffrey Schox

(57) ABSTRACT

A touch sensitive display assembly includes a touch screen and a button array. The touch screen is configured to display one or more input keys. The button array includes one or more buttons corresponding to the one or more input keys. The button array is formed by a substrate attached to a button membrane thereby creating a set of button cavities corresponding to the input keys. The button cavities are configured to be inflated and deflated by a pump coupled to a fluid reservoir. The cavities can be inflated/deflated together, in subsets, and/or individually. In some embodiments, the button array is sandwiched between a touch sensing layer and a display of the touch screen. In other embodiments, the button array can be located either above or below the touch screen.

20 Claims, 10 Drawing Sheets

(51) Int. Cl.
*G06F 3/02* (2006.01)
*G06F 3/01* (2006.01)

(56) References Cited

U.S. PATENT DOCUMENTS

| | | | |
|---|---|---|---|
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,772,205 A | 9/1988 | Chlumsky et al. | |
| 4,920,343 A | 4/1990 | Schwartz | |
| 4,940,734 A | 7/1990 | Ley et al. | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,369,228 A | 11/1994 | Faust | |
| 5,412,189 A | 5/1995 | Cragun | |
| 5,459,461 A | 10/1995 | Crowley et al. | |
| 5,488,204 A | 1/1996 | Mead et al. | |
| 5,496,174 A * | 3/1996 | Garner | 434/114 |
| 5,496,175 A | 3/1996 | Oyama et al. | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | Maclean et al. | |
| 6,573,844 B1 | 6/2003 | Venolia et al. | |
| 6,636,202 B2 | 10/2003 | Ishmael, Jr. et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 * | 6/2004 | Prince et al. | 434/113 |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,218,313 B2 | 5/2007 | Marcus et al. | |
| 7,233,313 B2 | 6/2007 | Levin et al. | |

(56) References Cited

U.S. PATENT DOCUMENTS

| | | |
|---|---|---|
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |

(56) References Cited

U.S. PATENT DOCUMENTS

| | | |
|---|---|---|
| 8,400,402 B2 | 3/2013 | Son |
| 8,400,410 B2 | 3/2013 | Taylor et al. |
| 8,749,489 B2 | 6/2014 | Ito et al. |
| 2001/0008396 A1 | 7/2001 | Komata |
| 2001/0043189 A1 | 11/2001 | Brisebois et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1* | 10/2006 | Panotopoulos et al. ........ 345/168 |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0073241 A1 | 3/2010 | Ayala et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0074691 A1 | 3/2011 | Causey et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |

(56) References Cited

U.S. PATENT DOCUMENTS

| | | |
|---|---|---|
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| CN | 1882460 A | 12/2006 |
| JP | 10255106 | 9/1998 |
| JP | 2006268068 A | 10/2006 |
| JP | 2006285785 A | 10/2006 |
| JP | 2009064357 A | 3/2009 |
| KR | 100677624 B | 1/2007 |
| WO | 2004028955 A | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

* cited by examiner

SYSTEM AND METHODS FOR RAISED TOUCH SCREENS

CROSS-REFERENCE TO RELATED APPLICATIONS

This application is a continuation of U.S. patent application Ser. No. 14/014,014, filed on 29 Aug. 2013, which is a continuation of U.S. patent application Ser. No. 11/969,848, filed on 4 Jan. 2008 and issued as U.S. Pat. No. 8,547,339 on 1 Oct. 2013, all of which are incorporated in their entireties by this reference.

BACKGROUND OF THE INVENTION

This invention relates generally to touch sensitive displays. More particularly, this invention relates to cost effective systems and methods for selectively raising portions of touch sensitive displays.

Touch sensitive displays, e.g., touch screens, are very useful in applications where a user can input commands and data directly on a display. Common applications for touch screens include consumer products such as cellular telephones and user interfaces for industrial process control. Depending on their specific applications, these touch sensitive displays are commonly used in devices ranging from small handheld PDAs to large pieces of industrial equipment.

While it is convenient to be able to input and output data to and from the user on the same display, unlike a dedicated input device such as a keypad with discrete well-defined keys, most touch sensitive displays are generally flat. As a result, touch sensitive screens do not provide any tactile guidance for control "button(s)". Instead, touch sensitive displays rely on visual guidance for user input.

Hence a serious drawback of touch sensitive displays is its inherent difficulty to input data accurately because adjacent buttons are not distinguishable by feel. Wrongly entered key strokes are common and the user is forced to keep his or her eyes on the display. The lack of tactile guidance is especially critical in industrial settings where potentially dangerous machines and parts are in constant motion such as an automobile assembly line, and also when operating the controls of a moving vehicle such as making a cellular telephone call while driving.

It is therefore apparent that an urgent need exists for an improved touch sensitive display which provides tactile guidance to the user that is easy to manufacture, easy to retrofit, shock resistant, impact resistant, remains compact and portable, cost effective, and durable.

SUMMARY OF THE INVENTION

To achieve the foregoing and in accordance with the present invention, systems and methods for tactile guidance in touch sensitive screens are provided. Such touch screens can be operated very effectively and more safely without substantially increasing cost.

In one embodiment of the invention, a touch sensitive display assembly includes a touch screen and a button array. The touch screen is configured to display one or more input keys. The button array includes one or more buttons corresponding to the one or more input keys. The button array is formed by a substrate attached to a button membrane thereby creating a set of button cavities corresponding to the input keys.

The button cavities are configured to be inflated and deflated by a pump coupled to a fluid reservoir. The cavities can be inflated/deflated together, in subsets, and/or individually. In some embodiments, the button array is sandwiched between a touch sensing layer and a display of the touch screen. In other embodiments, the button array can be located either above or below the touch screen.

These and other features of the present invention will be described in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1A:
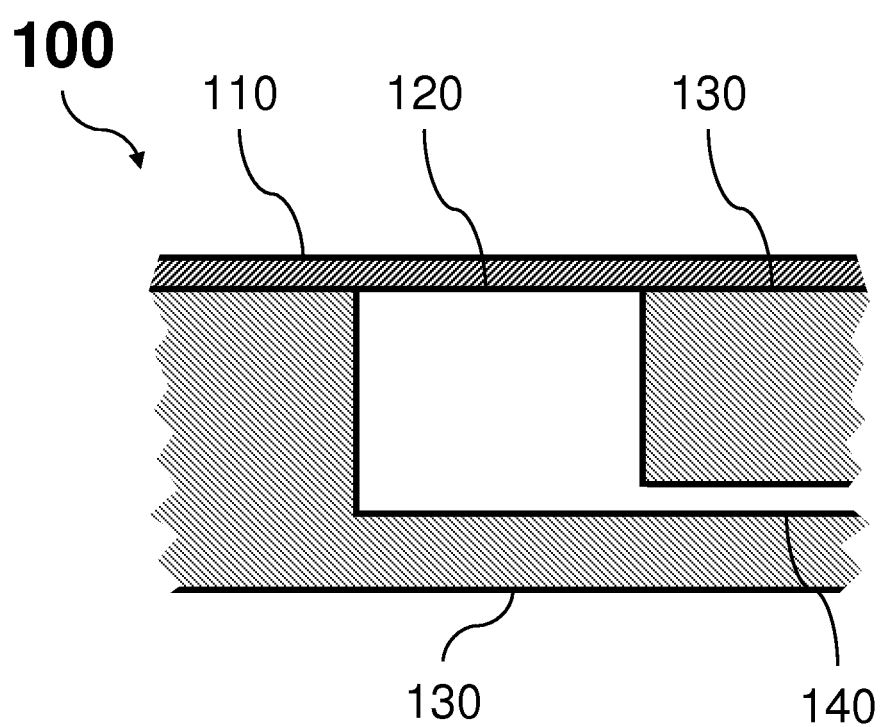
FIGS. 1A and 1B are cross-sectional views illustrating the operation of a button array in accordance with the present invention.
Figure 1B:
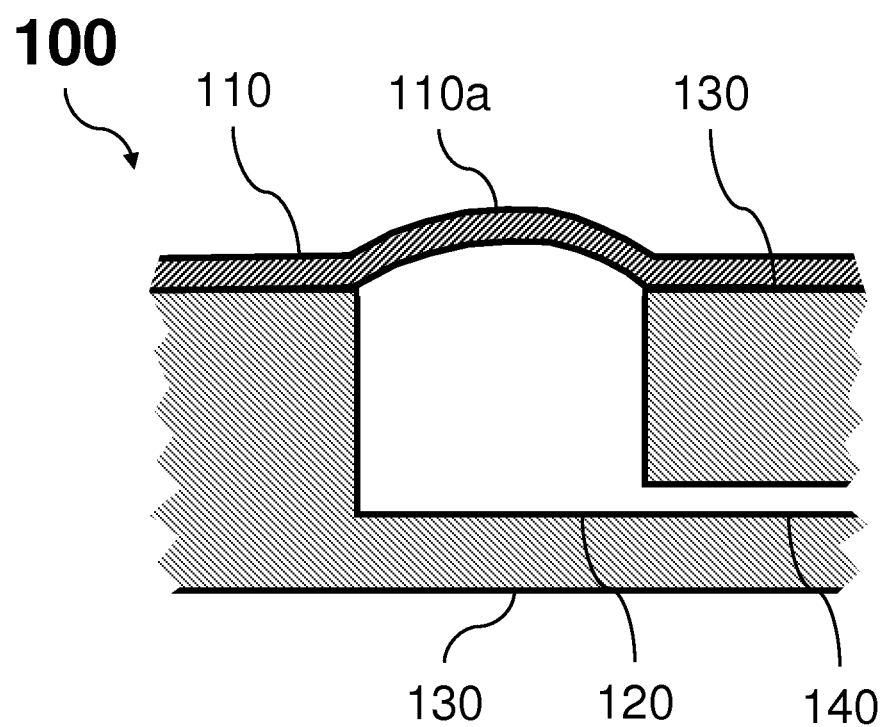

FIGS. 1A and 1B are cross-sectional views illustrating the operation of a button array 100, useful in association with a touch sensitive display, in accordance with the present invention. Although only one button is shown, button array can include one or more buttons. In the following discussion and in the claims, touch sensitive display is used interchangeably with touch screen. Referring first to FIG. 1A, button array 100 includes a substrate 130 and a membrane 110 which are coupled to each other to form one or more enclosed cavities, e.g., enclosed cavity 120.

Substrate 130 can be made from a suitable optically transparent material including polymers or glass, for example, elastomers, silicon-based organic polymers such as polydimethylsiloxane (PDMS), thermoset plastics such as polymethyl methacrylate (PMMA), and photocurable solvent resistant elastomers such as perfluropolyethers. In some embodiments, substrate 130 is a single homogenous layer approximately 1 mm to 0.1 mm thick and can be manufactured using well-known techniques for micro-fluid arrays to create one or more cavities and/or micro channels. It is also possible to construct substrate 130 using multiple layers from the same material or from different suitable materials.

Membrane 110 can be made from a suitable optically transparent and elastic material including polymers or silicon-based elastomers such as poly-dimethylsiloxane (PDMS) or polyethylene terephthalate (PET). In some embodiments, membrane is a single homogeneous layer less than 1 mm thick (preferably 50 to 200 microns) and can be manufactured using techniques known to one skilled in the art. It is also possible to construct membrane 110 using multiple layers from the same material or from different suitable materials. Membrane 110 can be attached to substrate 130 using a suitable adhesive, ultra-sonic bonding, oxygen plasma surface treatment or any other suitable techniques known to one skilled in the art.

Enclosed cavity 120, formed between substrate 130 and membrane 110, is fluid tight and coupled via a fluid channel 140 to one or more fluid pumps (not shown in FIG. 1A). Note that the pump(s) can either be internal or external with respect to a touch screen assembly incorporating button array 100.

A suitable button fluid can be used to inflate exemplary cavity 120. To minimize optical distortion, the refractive index of the button fluid should be substantially similar to that of substrate 130 and also membrane 110. Depending on the application, suitable fluids include water and alcohols such isopropanol or methanol. It may also be possible to use an oil-based fluid such as Norland's index matching liquid (IML) 150 available from Norland Products of Cranbury, N.J.

Referring now to FIG. 1B, when button array 100 needs to be activated, i.e., raised or in other words inflated, fluid pressure inside cavity 120 is increased thereby causing membrane portion 110a to be raised. In this example which is suitable for a handheld device, cavity 120 has a cavity diameter of approximately 5 mm and membrane 110 is approximately 100 micron thick. Conversely, when button array 100 needs to be deactivated, fluid pressure inside cavity 120 is decreased thereby causing cavity 120 to deflate and membrane portion 110a to return to its original flat profile. It is contemplated that a button fluid pressure of approximately 0.2 psi and a button fluid displacement of about 0.03 ml should be sufficient to raise membrane (button) portion 110a by about 1 mm.

Figure 2:
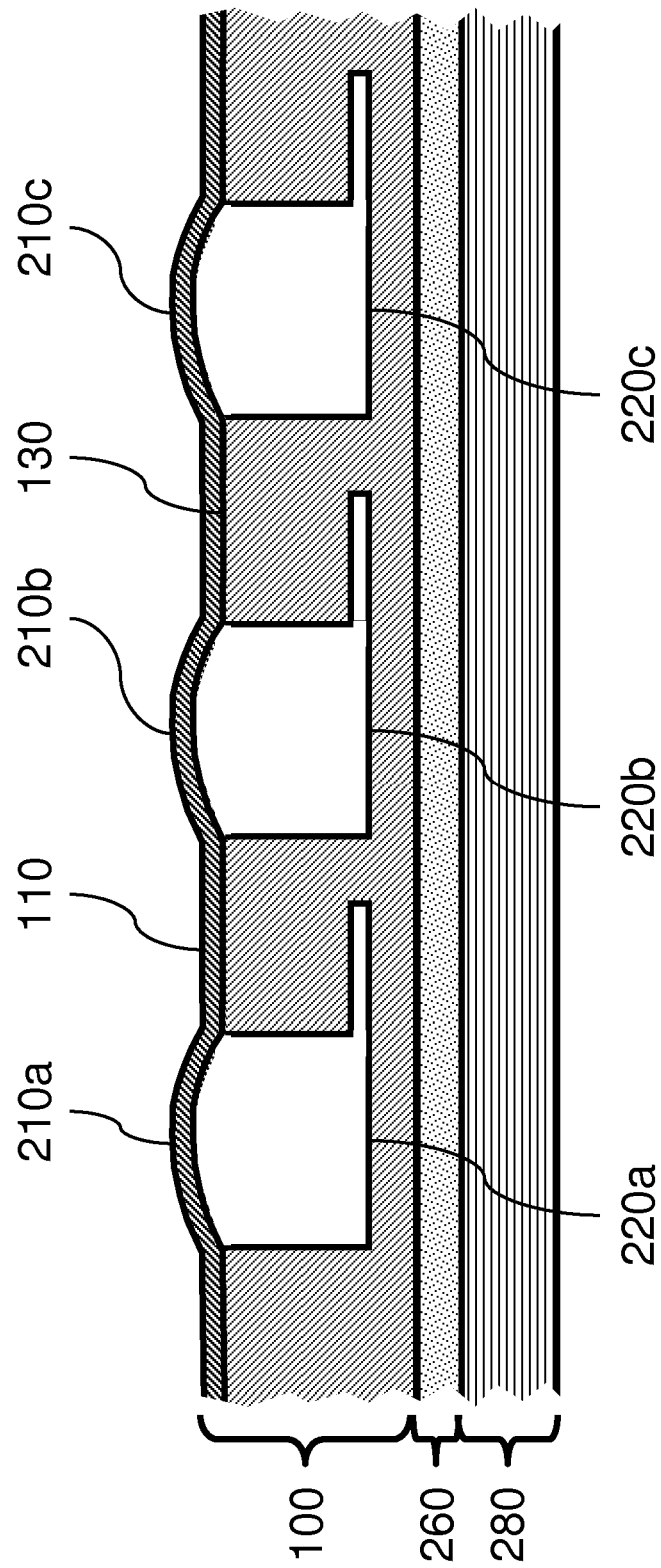
FIG. 2 is a cross-sectional view of one embodiment of the present invention.

FIG. 2 shows a cross-sectional view of one embodiment of a touch sensitive display assembly comprising button array 100 of the present invention located on top of a touch display which includes a touch sensing layer 260 and a display screen 280. In this embodiment, button array 100 includes multiple cavities 220a, 220b, 220c and corresponding membrane portions 210a, 210b, 210c. Button array 100 is located just above touch sensing layer 260. Although FIG. 2 shows button array 100 in contact with touch sensing layer 260, it may be possible for a gap to exist between array 100 and sensing layer 260. The gap may optionally be filled with a suitable flexible solid or fluid material.

It is also possible for display screen 280 to include sensors that provide input capability thereby eliminating the need for sensing layer 260. For example, an LCD with embedded optical sensors both touch screen and scanner functions was announced in a 2007 press release by Sharp Electronics of Japan.

Figure 3A:
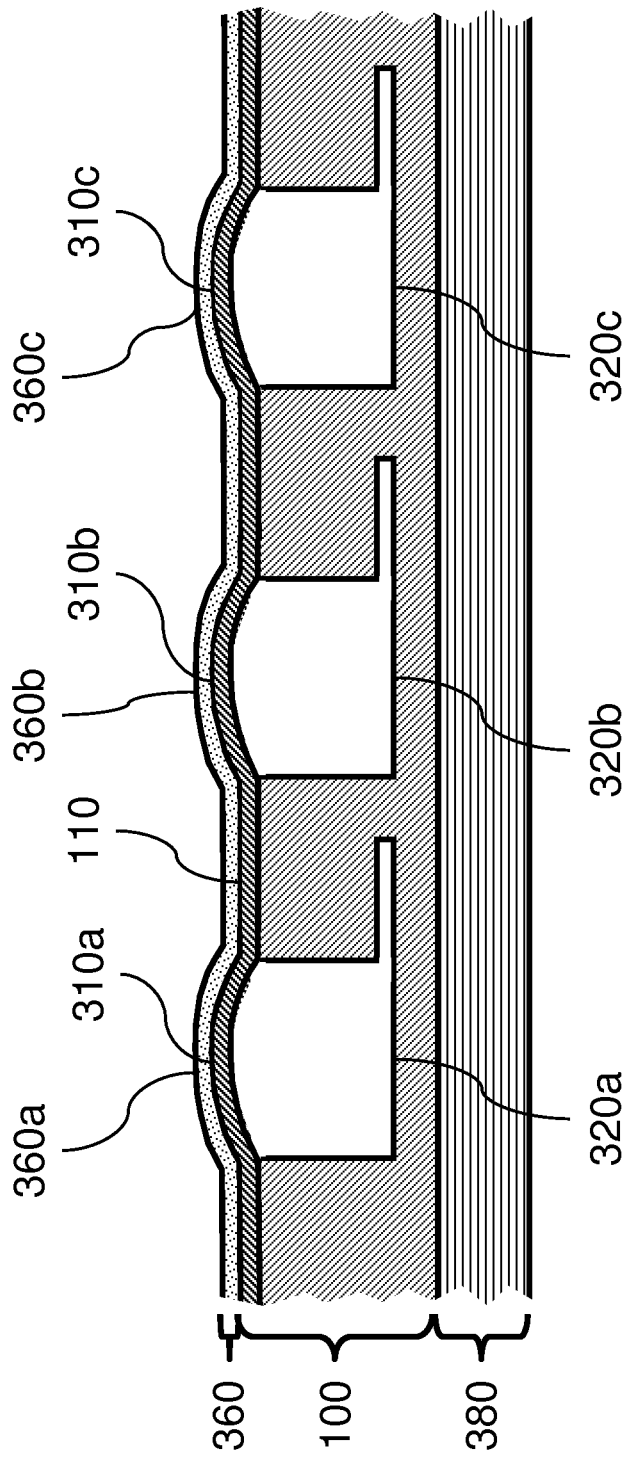
FIGS. 3A, 3B and 4 are cross-sectional views of alternate embodiments of the present invention.

FIG. 3A is a cross-sectional view of another embodiment of a touch sensitive display assembly of the present invention wherein a touch sensing layer 360 and a display screen 380 of the touch sensitive display are separated. Button array 100 includes multiple cavities 320a, 320b, 320c and corresponding membrane portions 310a, 310b, 310c. In this embodiment, button array 100 is sandwiched between a flexible touch sensing layer 360 and display screen 380. As a result, raising membrane portions 310a, 310b, 310c results in the raising of sensing layer portions 360a, 360b, 360c, respectively.

Figure 3B:
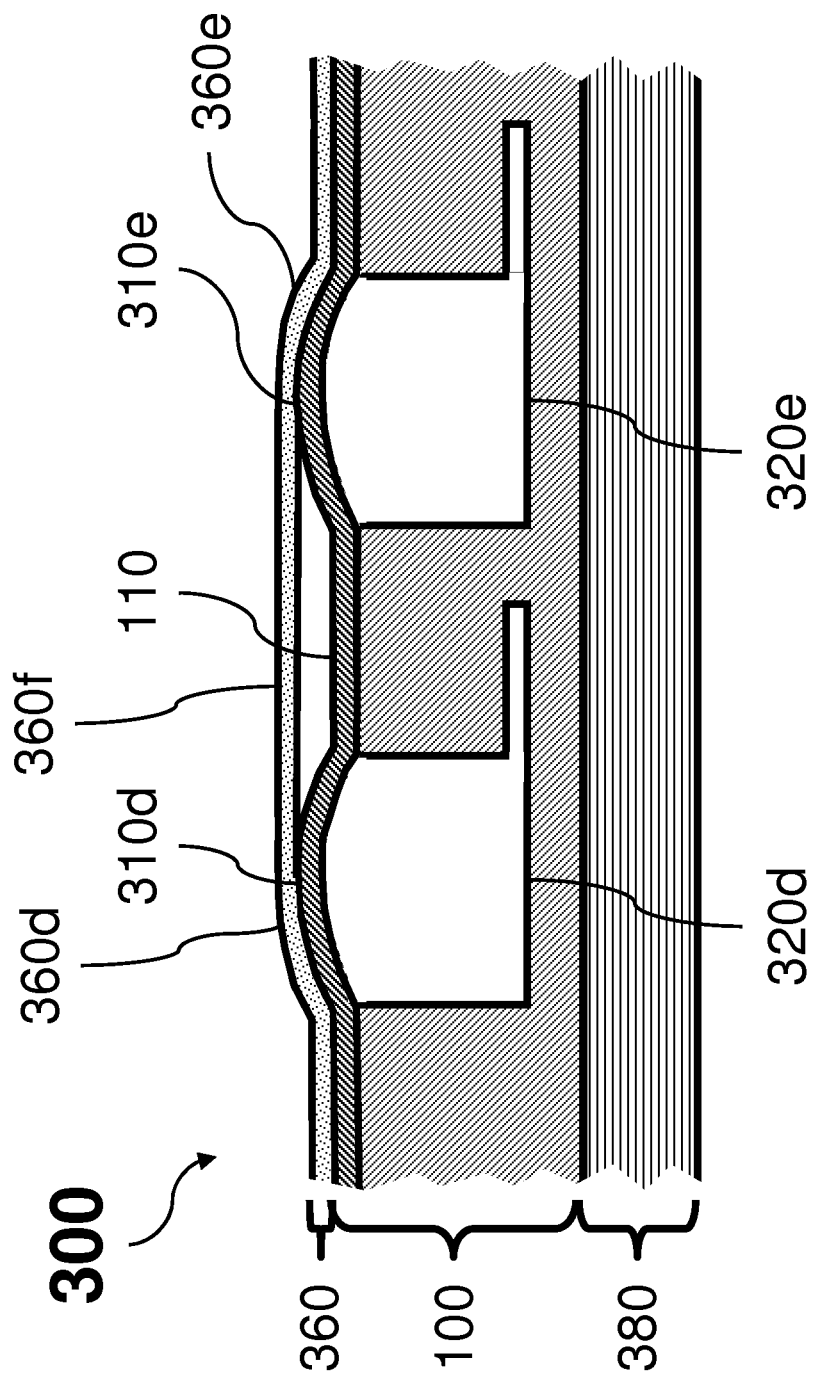

FIG. 3B is a cross-sectional view of a variation of the touch sensitive display assembly of FIG. 3A wherein two or more cavities are inflated, a contiguous portion of touch sensing layer 360 is raised. In this embodiment, button array 100 is also sandwiched between touch sensing layer 360 and display screen 380. When cavities 320d, 320e are inflated, corresponding membrane portions 310d, 310e are raised, thereby causing the raising of sensing layer portions 360d, 360e. In addition, raising membrane portions 310d, 310e also results in the raising of touch sensing layer portion 360f located between sensing layer portions 360d, 360e.

Figure 4:
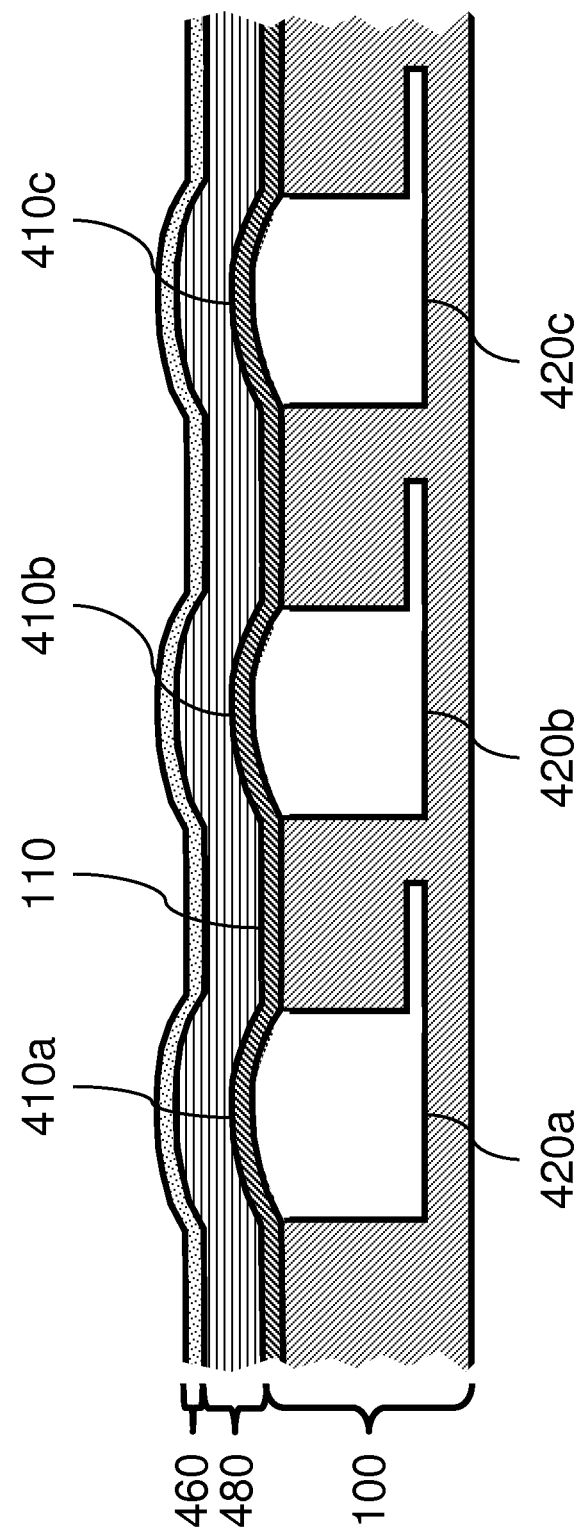

FIG. 4 is a cross-sectional view illustrating yet another embodiment of a touch sensitive display assembly wherein the entire touch screen is made from flexible material(s). Hence, the touch screen includes a flexible touch sensing layer 460 and a flexible display screen 480. Button array 100 includes one or more cavities 420a, 420b, 420c and corresponding membrane portions 410a, 410b, 410c. In this embodiment, button array 100 is located below display screen 480.

As discussed above, button array 100 and sensing layer 460 may be attached directly to each other or array 100 and layer 460 may be operatively coupled to each other via a suitable intermediate solid or fluid material.

Figure 5:
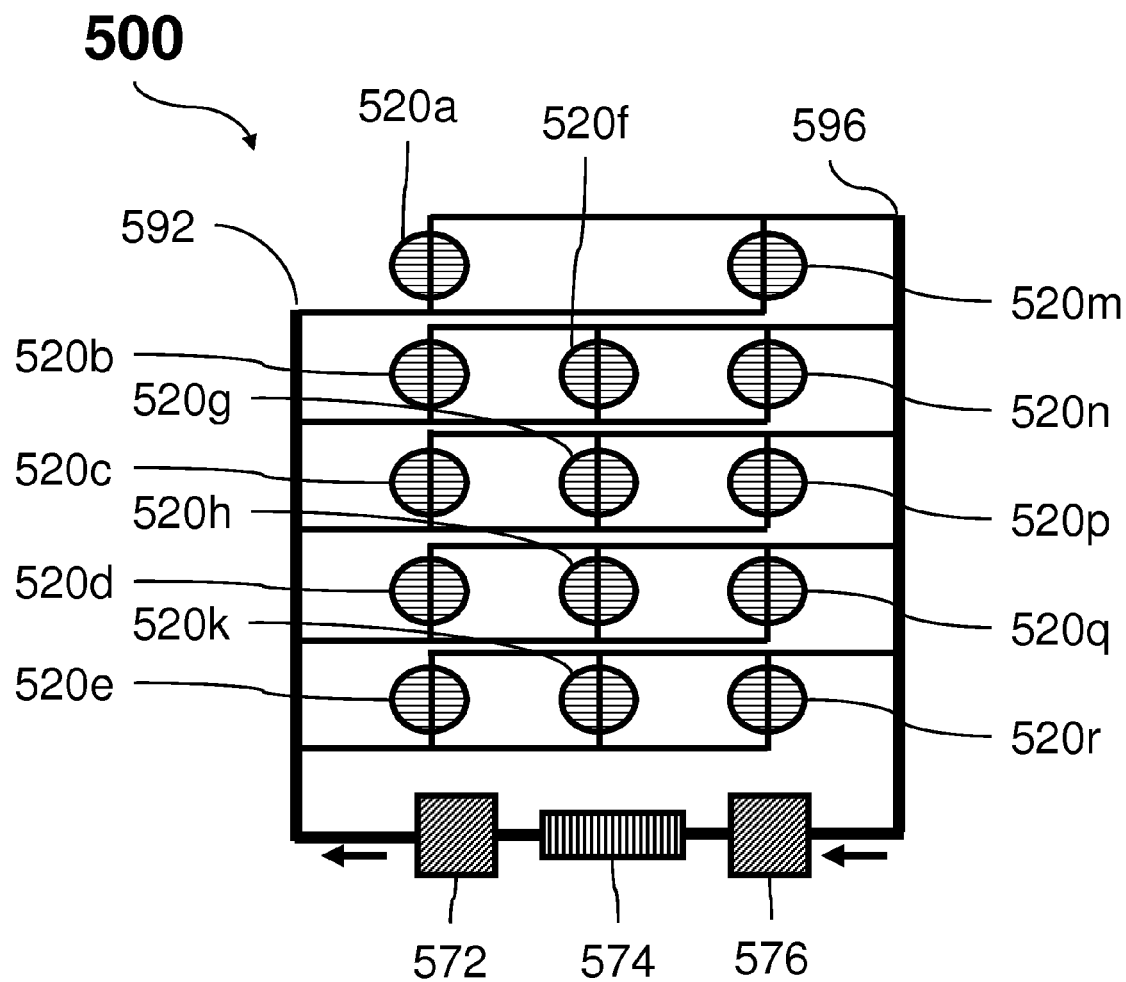
FIGS. 5 and 6 are top views showing a button array and an exemplary touch screen which can be combined to form an exemplary input and output (I/O) user interface suitable for telephone-based communication applications.
Figure 6:
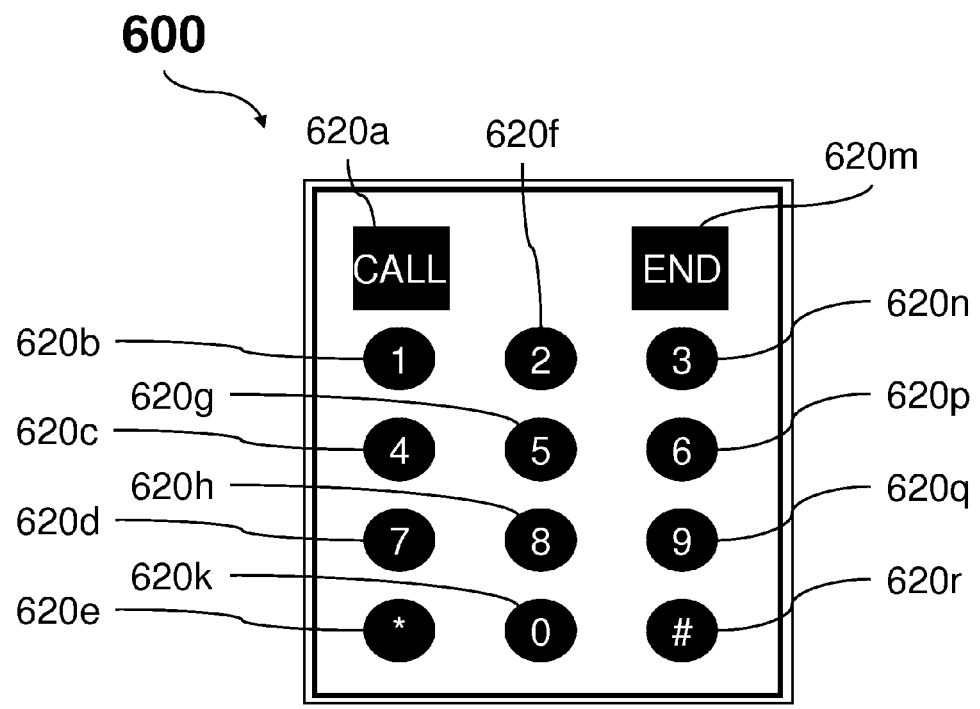

FIGS. 5 and 6 are top views showing a button array 500 and an exemplary touch screen 600 which can be combined to form an exemplary input and output (I/O) user interface suitable for telecommunication applications. While the following description uses the 14-key telephone-based keypad of FIG. 5, the present invention is also applicable to many other non-telecommunication applications.

Button array 500 includes cavities 520a, 520b, 520c, 520d, 520e, 520f, 520g, 520h, 520k, 520m, 520n, 520p, 520q, 520r, while touch screen 600 is configured to able to display a set of corresponding input keys 620a, 620b, 620c, 620d, 620e, 620f, 620g, 620h, 620k, 620m, 620n, 620p, 620q, 620r. In this example, cavities 520a, 520b, 520c . . . 520r are overlaid on corresponding input keys 620a, 620b, 620c . . . 620r, using the exemplary techniques described above for the embodiments of FIGS. 2, 3A, 3B, 4.

As shown in FIG. 5, button array 500 is coupled to fluid pumps 572, 576. A fluid reservoir 574 is located between fluid pumps 572, 576. Suitable commercially available fluid pumps include pump #MDP2205 from ThinXXs Microtechnology AG of Zweibrucken, Germany and also pump #mp5 from Bartels Mikrotechnik GmbH of Dortmund, Germany.

Button array 500 is coupled to inflating fluid pump 572 and deflating fluid pump 576 via inlet fluid channel system 592 and outlet fluid channel system 596, respectively. In this example, fluid channel systems 592, 596 vary in width, i.e., wider in width nearer pumps 572, 576, in order to ensure fluid pressure and flow uniformity, in a manner similar to a human circulatory system.

Although the techniques discussed are applicable to many embodiments of the present invention, including the embodiments of FIGS. 2, 3A, 3B, 4, for this discussion, reference is made to the embodiment of FIG. 2. For ease of explanation, in the following discussion, all cavities 520a, 520b, 520c . . . 520r are inflated and deflated at the same time. Note that in some implementations, depending in the specific applications, cavities, e.g., cavities 520*a*, 520*b*, 520*c* . . . 520*r*, can be inflated and/or deflated individually, in subsets and/or as a complete set.

In this embodiment, inflating pump 572 is activated for a pre-determined period of time whenever cavities 520*a*, 520*b*, 520*c* . . . 520*r* need to be inflated. Note that deflating pump 576 remains "off" during inflation of cavities 520*a*, 520*b*, 520*c* . . . 520*r*. As a result, pump 572 is able to transfer fluid from fluid reservoir 574 to cavities 520*a*, 520*b*, 520*c* . . . 520*r*, until the required fluid pressure is accomplished. Inflating pump 572 is now deactivated, and both pumps 572, 576 are "off". Fluid pressure is maintained in cavities 520*a*, 520*b*, 520*c* . . . 520*r* to keep them inflated.

Conversely, deflating pump 576 is activated for a pre-determined period of time whenever cavities 520*a*, 520*b*, 520*c* . . . 520*r* need to be deflated. Inflating pump 572 remains "off" during deflation of cavities 520*a*, 520*b*, 520*c* . . . 520*r*. As a result, deflating pump 576 is able to transfer fluid from cavities 520*a*, 520*b*, 520*c* . . . 520*r* back to fluid reservoir 574 to, until the required fluid pressure returns to the original value when deflating pump 576 is turned "off".

Other pump configurations are also possible. For example, it is possible to replace pumps 572, 576 with a single bi-directional pump. It may also be possible to deflate cavities by opening value(s) to the fluid reservoir and let the fluid pressure decrease without the need for a separate deflating pump.

Figure 7:
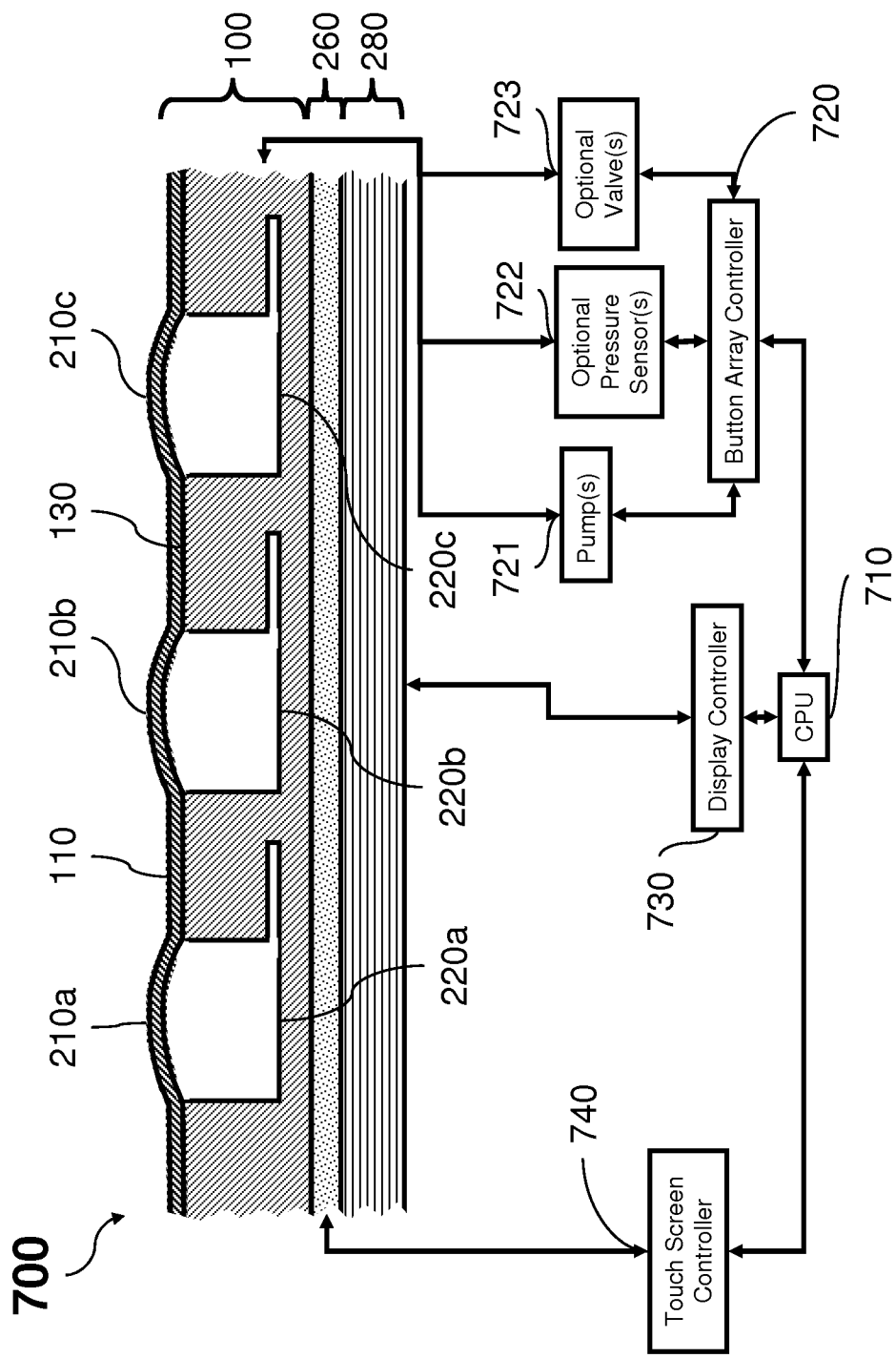
FIG. 7 is a block diagram illustrating one exemplary implementation of a device incorporating the touch sensitive user interface of the button array in accordance with the present invention.

FIG. 7 is a block diagram illustrating one exemplary implementation of a device 700 incorporating a touch sensitive user interface in accordance with the present invention. Device 700 includes a microprocessor (CPU) 710, a button array controller 720, pump(s) 721, and button array 100. Depending on the implementation, device 700 may also include pressure sensor(s) 722 and valve(s) 723 coupled to pump(s) 720. Device 700 also includes a display controller 730 coupled to a display screen 280, and a touch screen controller 740 coupled to touch sensing layer 260.

Figure 8:
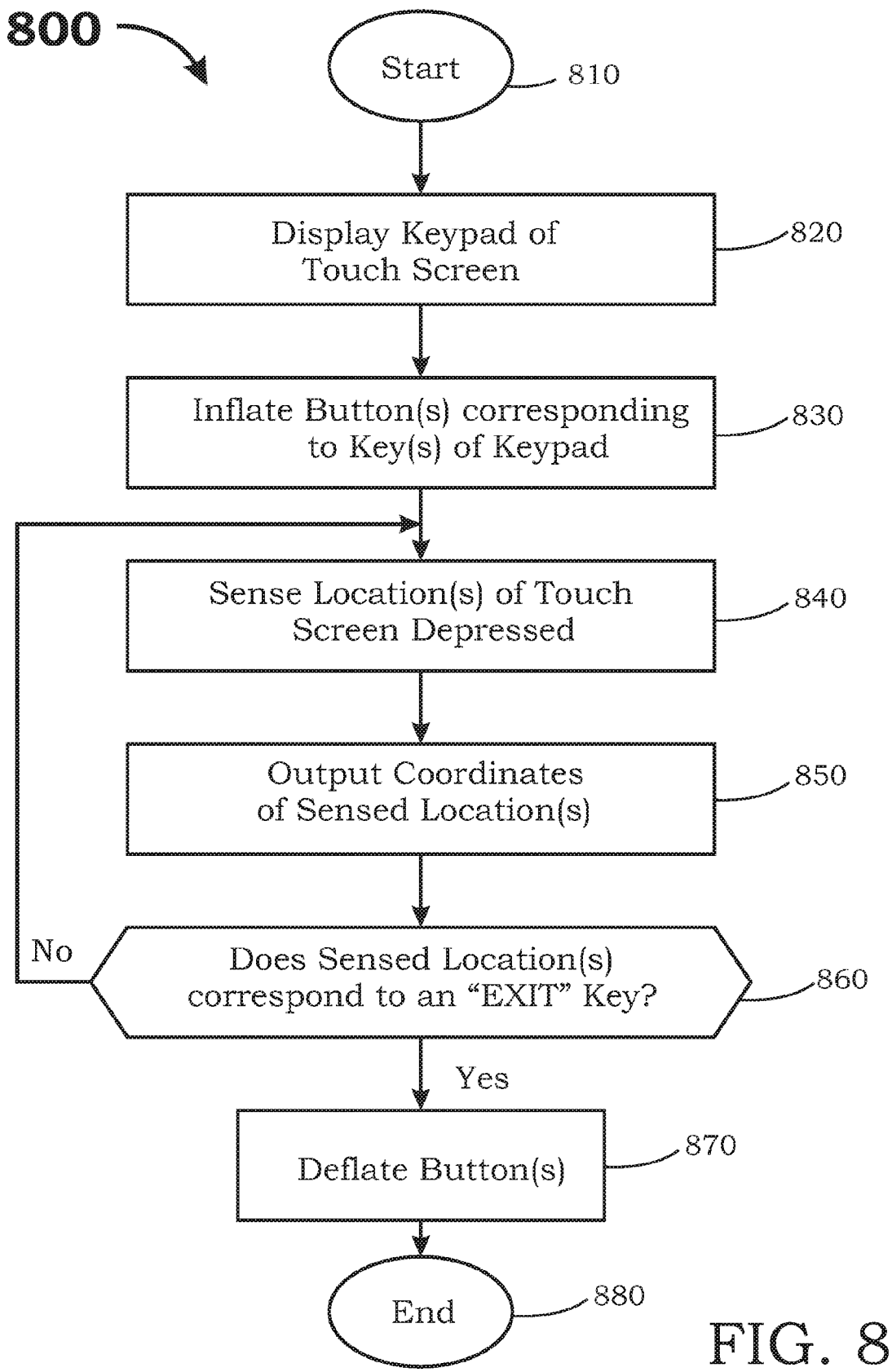
FIG. 8 is a flowchart illustrating the operation of touch screen assemblies of the present invention, including the embodiments shown in FIGS. 2, 3A, 3B and 4.

FIG. 8 is a flowchart illustrating the operation of touch screen assemblies of the present invention, including the embodiments shown in FIGS. 2, 3A, 3B and 4. Referring to FIGS. 5 through 8, and using the embodiment of FIG. 2 as an example, in step 820, when display controller 730 causes display screen 280 to display a keypad, e.g., a telephone interface, button array controller 720 activates pump(s) 721 which causes button array 100, corresponding to the keys of keypad, to be inflated by increasing the pressure of the button fluid in cavities 220*a*, 220*b*, 220*c* (step 830).

In step 840, touch sensing layer 260 senses the location(s) of the user's depressions on one or more of corresponding membrane portions 210*a*, 210*b*, 210*c* of button array 100. Touch sensing layer 260 then outputs the coordinate(s) of the sensed location(s) to processor 710 via touch screen controller 740 (step 840).

If processor 710 recognizes that the sensed location(s) correspond to an "EXIT" type key, for example, a "CALL" key or an "END" key in this exemplary telecom implementation, then button array 200 is deflated (step 860). Otherwise, touch sensing layer 260 continues to sense location(s) of subsequent user depression(s) and outputting the sensed location(s) coordinates to touch screen controller 740 (repeat step 840, 850).

Many modifications and additions are contemplated within the spirit of the present invention. For example, it is possible to add distortion correction capability to display screens 280, 380, 480 for correcting any optical distortion that may be introduced by button array 100. It may also be possible to include a set of pressure sensors coupled to each of the corresponding cavities of button array 100 thereby eliminating the need for touch sensing layers 260, 360, 460.

While the present invention has been described with reference to particular embodiments, it will be understood that the embodiments are illustrative and that the inventive scope is not so limited. In addition, the various features of the present invention can be practiced alone or in combination. Alternative embodiments of the present invention will also become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

I claim:

1. A user interface system comprising:
a flexible touch sensing layer defining a deformable region, defining a peripheral region adjacent the deformable region, and outputting signals corresponding to touch inputs on the deformable region and the peripheral region;
a substrate coupled to the flexible touch sensing layer along a perimeter of the deformable region, cooperating with the deformable region to define a cavity, and defining a fluid channel fluidly coupled to the cavity;
a displacement device displacing fluid into the cavity via the fluid channel to transition the deformable region from a deflated setting into an inflated setting, the deformable region substantially flush with the peripheral region in the deflated setting and elevated above the peripheral region in the inflated setting; and
a processor detecting inputs on the flexible touch sensing layer proximal the deformable region in the deflated setting and in the inflated setting according to outputs of the flexible touch sensing layer.

2. The user interface system of claim 1, further comprising a flexible display interposed between the substrate and the flexible touch sensing layer, defining a first region attached to the substrate and to the peripheral region of the flexible touch sensing layer, and defining a second region adjacent the deformable region of the flexible touch sensing layer and disconnected from the substrate.

3. The user interface system of claim 1, further comprising an elastic membrane interposed between the substrate and the flexible touch sensing layer, defining a first region attached to the substrate and to the peripheral region of the flexible touch sensing layer, and defining a second region adjacent the deformable region of the flexible touch sensing layer and disconnected from the substrate.

4. The user interface system of claim 3, wherein the first region of the elastic member defines a perimeter about the cavity, and wherein a portion of the deformable region of the flexible touch sensing layer extends over the perimeter.

5. The user interface system of claim 3, wherein the substrate comprises a substantially transparent material, wherein the elastic membrane comprises a substantially transparent material, and further comprising a display coupled to the substrate opposite the elastic membrane.

6. The user interface system of claim 5, wherein the display renders an image of a digital keypad, a particular key of the digital keypad substantially aligned with the deformable region.

7. The user interface system of claim 6, wherein, in response to an input on the deformable region, the processor controls a function of a device coupled to the processor based on the particular key.

8. The user interface of claim 1, further comprising a reservoir containing fluid, wherein the substrate defines an inlet manifold and an exhaust manifold fluidly coupled to the fluid channel, and wherein the displacement device comprises an inflating pump and a deflating pump, the inflating pump displacing fluid from the reservoir into the cavity via the inlet manifold to transition the deformable region from the deflated setting into the inflated setting, the deflating pump displacing fluid from the cavity into the reservoir via the exhaust manifold to transition the deformable region from the inflated setting into the deflated setting.

9. The user interface of claim 8, further comprising a second processor activating the inflating pump for a pre-determined period of time to transition the deformable region from the deflated setting into the inflated setting, the second processor activating the deflating pump for a pre-determined period of time to transition the deformable region from the inflated setting into the deflated setting.

10. The user interface of claim 8, wherein the deflating pump comprises a valve arranged between the exhaust manifold and the reservoir.

11. The user interface of claim 1, wherein the displacement device increases fluid pressure within the cavity by approximately two-tenths of a pound-per-square-inch to transition the deformable region from the deflated setting into the inflated setting.

12. The user interface of claim 1, further comprising a pressure sensor coupled to the cavity, wherein the displacement controls fluid pressure within the cavity according to an output of the pressure sensor.

13. The user interface of claim 1, wherein the displacement device displaces approximately three-hundredths of one milliliter of fluid into the cavity to transition the deformable region from the deflated setting into the inflated setting.

14. The user interface of claim 1, wherein a surface of the flexible touch sensing layer at the deformable region and a surface of the flexible touch sensing layer at the peripheral region define a planar surface in the deflated setting, and wherein the surface of the flexible touch sensing layer at the deformable region is tactilely distinguishable from the surface of the flexible touch sensing layer at the peripheral region in the inflated setting.

15. The user interface of claim 14, wherein a surface of the flexible touch sensing layer at the deformable region is raised above a surface of the flexible touch sensing layer at the peripheral region by approximately one millimeter in the inflated setting.

16. A user interface system comprising:
a flexible display screen defining a deformable region, defining a peripheral region adjacent the deformable region, and outputting signals corresponding to touch inputs on the deformable region and the peripheral region;
a substrate coupled to the flexible display screen along a perimeter of the deformable region, cooperating with the deformable region to define a cavity, and defining a fluid channel fluidly coupled to the cavity;
a displacement device displacing fluid into the cavity via the fluid channel to transition the deformable region from a deflated setting into an inflated setting, the deformable region substantially flush with the peripheral region in the deflated setting and elevated above the peripheral region in the inflated setting; and
a display controller controlling the flexible display screen to render an image of a digital keypad, a key of the digital keypad substantially aligned with the deformable region in the inflated setting.

17. The user interface system of claim 16, further comprising a flexible touch sensor layer arranged over the flexible display screen opposite the substrate, the flexible touch sensor layer extending across the deformable region and the peripheral region.

18. The user interface system of claim 17, further comprising a processor detecting inputs proximal the deformable region in the deflated setting and in the inflated setting according to outputs of the flexible touch sensing layer.

19. The user interface system of claim 16,
wherein the flexible display screen defines a second deformable region,
wherein the substrate is coupled to the flexible display screen along a perimeter of the second deformable region, cooperates with the deformable region to define a second cavity, and defining a second fluid channel fluidly coupled to the cavity, and
wherein the displacement device displaces fluid into the second cavity via the second fluid channel to transition the second deformable region from the deflated setting into the inflated setting,
a second key of the digital keypad substantially aligned with the second deformable region in the inflated setting.

20. The user interface of claim 16, wherein a surface of the flexible display screen at the deformable region and a surface of the flexible display screen at the peripheral region define a planar surface in the deflated setting, and wherein the surface of the flexible display screen at the deformable region is tactilely distinguishable from the surface of the flexible display screen at the peripheral region in the inflated setting.

* * * * *